United States Patent [19]

Kahle et al.

[11] 4,157,835
[45] Jun. 12, 1979

[54] STRIP SEAL FOR STUFFING BOX PACKING

[76] Inventors: Otto Kahle, Leegmoor 42, 2000 Hamburg 62; Günter Reichow, Eichhof 3, 2105 Seevetal 6, both of Fed. Rep. of Germany

[21] Appl. No.: 867,495

[22] Filed: Jan. 6, 1978

Related U.S. Application Data

[63] Continuation-in-part of Ser. No. 674,287, Apr. 6, 1976, abandoned.

[30] Foreign Application Priority Data

Apr. 8, 1975 [DE] Fed. Rep. of Germany ....... 7510916

[51] Int. Cl.² .............................................. F16J 15/24
[52] U.S. Cl. .................................... 277/102; 277/204; 277/215; 277/DIG. 6; 428/167
[58] Field of Search ......... 277/102, 196, 198, DIG. 6, 277/123, 124, 203, 204, 215, 237 R; 428/167, 169

[56] References Cited

U.S. PATENT DOCUMENTS

| | | | |
|---|---|---|---|
| 1,369,905 | 3/1921 | Peters | 277/215 |
| 1,426,459 | 8/1922 | Cann et al. | 277/215 |
| 1,532,961 | 4/1925 | Travers | 277/215 |
| 1,543,963 | 6/1925 | Walton | 277/204 X |
| 2,489,715 | 11/1949 | Mark et al. | 277/215 X |
| 3,490,986 | 1/1970 | Ahrabi | 277/237 X |
| 4,068,853 | 1/1978 | Schnitzler | 277/204 X |

FOREIGN PATENT DOCUMENTS

| | | | |
|---|---|---|---|
| 499480 | 1/1939 | United Kingdom | 277/134 |
| 620540 | 3/1949 | United Kingdom | 277/204 |

Primary Examiner—Robert S. Ward, Jr.

[57] ABSTRACT

A graphite containing strip seal for stuffing box packing made of graphite with a maximum modulus of elasticity of 2000 N/mm², with the strip seals having patterns of raised areas and indentations along at least one surface thereof such that when the strip is coiled there is no mating of the raised areas and the grooves.

8 Claims, 24 Drawing Figures

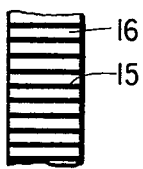  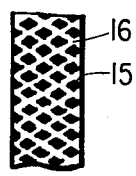  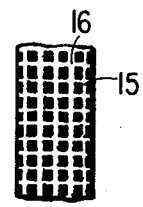 
Fig.5 Prior Art   Fig.6 Prior Art   Fig.7   Fig.8   Fig.9   Fig.10
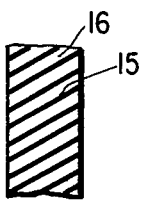  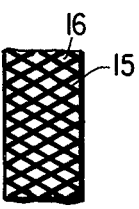  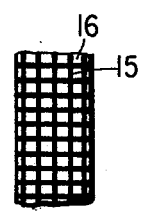 
Fig.11   Fig.12   Fig.13   Fig.14   Fig.15   Fig.16
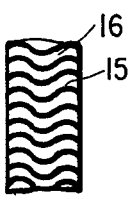  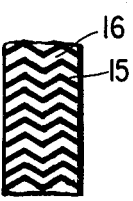  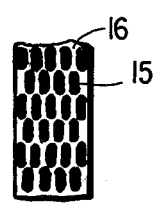 
Fig.17   Fig.18   Fig.19   Fig.20   Fig.21   Fig.22
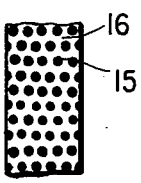 
Fig.23   Fig.24

STRIP SEAL FOR STUFFING BOX PACKING

RELATED APPLICATION

This is a Continuation in Part Application of copending U.S. Ser. No. 674,287 filed Apr. 6, 1976 by the same inventors now abandoned.

BACKGROUND OF THE INVENTION

This invention relates to a packing for a stuffing box and more particularly a graphite derived material which forms a strip seal around a rotatable shaft located therein.

A stuffing box is an annular chamber around a shaft or a plunger, defined on the inside by the surface of the shaft and on the outside by a coaxial, cylindrical casing wall. One axial end is substantially closed by a casing wall while the other end is open to receive a so-called gland. Sealing is effected by a packing of soft or at least yieldable material with which the stuffing box is filled and which is compressed by the gland, pressed axially into the stuffing box, so that the packing bears radially and sealingly upon the shaft surface. To this end, it is important that the packing has resilient properties in order to yield to slight radial motions of the shaft or of the plunger without losing contact therewith. It is therefore common practice to construct stuffing box packings from fibrous materials.

Because of the sealing requirement, graphite has been used in the past as the strip seal material.

Graphite strip seals have been of two general types. One of these types is in the form of compressed rings. These rings are made of conventionally processed crystalline graphite and has a high modulus of elasticity and, as a result, it is necessary for the stuffing box gland to apply high axial forces to these rings to insure the required radial contact. Consequently, the rings have essentially no further yield to radial motions of the shaft. Another difficulty is that the rings must be precisely shaped for specific fitting dimensions, and are therefore very costly.

It is also known to coil graphite packing from a strip seal which has a looser structure than conventional crystalline graphite. This material has a density of approximately 1.0 g/cm³ while crystalline graphite has a density of approximately 2.25/cm³. Its modulus of elasticity is less than 1000 N/mm², while normal crystalline graphite has a modulus of elasticity of approximately 9000 N/mm². Graphite is a brittle material. To enable a graphite strip nevertheless to be coiled, it is provided with a plurality of small grooves extending transversely to the longitudinal axis of the strip. Owing to the loose structure, a stuffing box packing produced from this material is more resilient than a packing of press-formed graphite rings; however, an even higher resilience would be desirable.

The known strip seal also suffers from the disadvantage of calling for high axial pressure to ensure reasonable uniform contact between the stuffing box packing and the surface of the shaft or plunger. It has been found that the stuffing box rings coiled from the aforementioned seal configuration offer a high resistance to axial force. If the axial force exceeds the resistance of the packing, the individual layers or strata thereof break uncontrollably within the packing and slide into each other, thus leading to an irregular distribution of sealing material within the cavity.

The prior art also discloses ring seals coiled from metal foil (German Pat. No. 434,041) in which the cross-section of the metal foil strips is corrugated. The strip has the same corrugation cross-section throughout so that the corrugations of the metal foil strips, which are placed one upon the other in the coiled ring, bear completely upon each other. If axial pressure is applied to this ring, the corrugations curve and simultaneously expand radially. Since the foil strips bear upon each other without any cavities and thus form a solid metal member, it follows that the ring is unable to yield to radial motions of the shaft or of the plunger. It is therefore inelastic. Accordingly, it is employed only for static purposes as a flat seal and is not used for moving shafts or plungers. It is also known from U.S. Pat. No. 3,378,432 and 3,956,543 cited during prosecution of the present application to provide plastics sheeting with a plurality of protuberances and indentations so as to render such sheeting deformable along its plane. However, this is unrelated to strip seals for stuffing box packings.

SUMMARY OF THE INVENTION

The seal according to this invention is in the form of a strip seal made in whole or in part from graphite and having raised areas and indentations along at least one of its surfaces patterned to prevent the raised areas from mating with the indentations. The patterned strip seal of this invention provides greater resilience to the packing produced therefrom than previously used graphite seals and also provides better sealing distribution and improved contact with the surface of the shaft when subjected to axial pressure from the gland. This resiliencey can be expressed as elastic recovery which, in the case of the seal of the present invention can be expressed as 3% at 15 Kgf/cm² and will be about 5% at 20Kgf/cm².

The graphite or graphite containing material of this invention has a maximum modulus of elasticity of 2000 N/mm² and is therefore, between the modulus of elasticity of the two prior art graphite forms.

The present invention will be better understood by reference to the accompanying drawings, in which.

FIGS. 5 and 6 show, in diagramatic form, the prior art; and FIGS. 7-24 show different embodiments of the strip seal of this invention also in diagramatic form with each of the odd numbered FIGS. 5-24 showing a plan view of one side of the strip and even numbered FIGS. in the FIGS. numbered 5-24 depicting a longitudinal section through the strip showing like parts numbered in a like manner throughout these FIGS.

Figure 1:
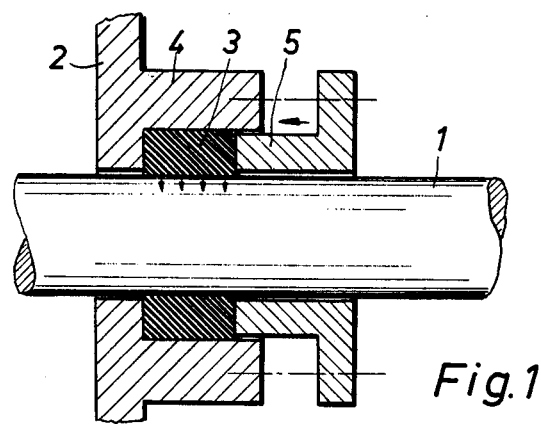
FIG. 1 is a diagrammatic longitudinal section through a stuffing box.

According to FIG. 1, a shaft or plunger l is sealed with respect to the casing 2 by means of a stuffing box packing 3 which is axially compressed in the stuffing box 4 by means of a gland 5 so that it is radially expanded and thus bears sealingly against the surface of the shaft 1.

Figure 2:
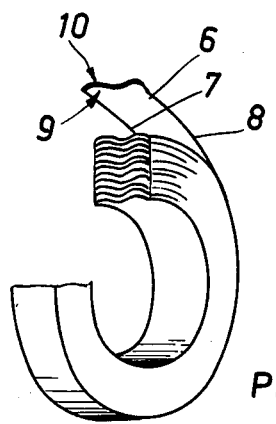
FIG. 2 is a perspective view of a stuffing box packing coiled from a conventional strip seal.

According to FIG. 2, the stuffing box packing 3 is constructed as a conventional spirally coiled strip seal 6 of graphite. The cross-sectional shape of the strip seal is that of a gently undulating W and this cross-sectional shape remains constant over the entire length of the strip. It is defined by two parallel edges 7 and 8 as well as a bottom and top surface 9, 10 which are parallel with each other. As can be seen, after axial compression, the prior art seal forms a substantially solid, continuous mass, when viewed radially. This is because compression pressure forces the scored strip into the gently undulating w-configuration depicted.

Figure 3:
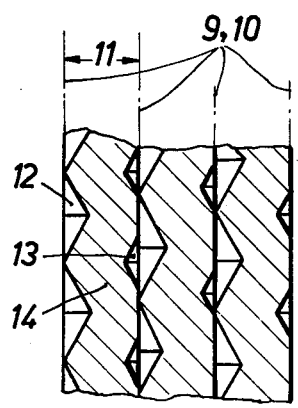
FIG. 3 shows an enlarged radial section through a stuffing box packing according to the invention in the unstressed state, and FIG. 4 in the stressed state.

By contrast, as illustrated in the embodiment depicted in FIG. 3, (as well as the other embodiments shown subsequently) the indentations 12, 13 of strips disposed one upon the other and the protuberances formed between the indentations do not normally mesh because their correlation is statistically random. FIG. 3 shows the sectional plane which contains the middle axis of the system and the radius.

Figure 4:
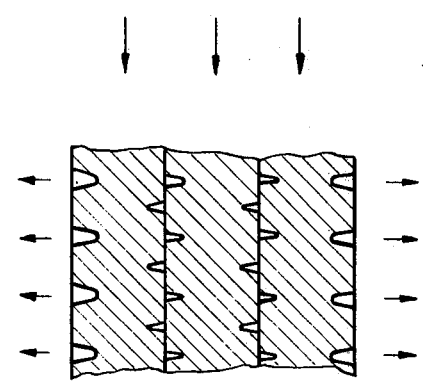

This Fig. also shows parts of three layers of the stuffing box each formed by superjacently disposed turns of the strip seal. The raised surface areas 9, 10 of the said turns bear upon each other. The principal surfaces of the strip are situated at a distance from each other (thickness of the strip) which is designated at 11. Small rhomboid indentations 12 and 13 are disposed in a regular serial arrangement (similar to that of FIG. 5) in both principal surfaces of the strip and the size of the indentations can be different on both sides. It is also possible for such indentations to be embossed into only one side of the strip. The indentations can have a different shape on both sides. To facilitate manufacture, it is convenient but not necessary for the indentations to be offset relative to each other on both sides. The offset configuration also offers the advantage that the strip member 14 between such indentations extends at a slight angle in section, so that it can be more readily radially deformed under elongation by the application of an axial force (arrows in FIG. 4). Because of the non-meshing of the raised areas and the indentations, when axial force is applied, as shown in FIG. 4 the minute cells formed during winding by the surface or the raised areas of one layer and the indentations in an abutting layer, do not disappear even though the strips form a compact, intimately-joined uniform seal about the shaft. These open areas or cells provide the desired added resilience to the seal.

The resilient characteristics of the said member must be imagined to be similar to that of a sponge. The plurality of the pores causes the walls of the member between the said pores to have a statistically different direction which partially also extends at an angle to the relevant direction along which the force acts. They do not therefore react rigidly to the application of force, but can be slightly bent. As a result, graphite which is intrinsically very hard and brittle, can have elastic characteristics in the shape according to the invention.

The gentle transverse undulation of the prior art strip shown in FIG. 2 is unrelated to this property. It enables the packing to be deformable under axial pressure; however, no radial elasticity is imparted to the packing ring. This is because the corrugation does not form permanent cavities in the packing. In the relaxed state, i.e., without the application of compression, the corrugations of the outermost or innermost turns are clear of the shaft or of the outer stuffing box wall to form cavities; however, these cavities disappear under axial pressure (see also FIG. 9 of the U.S. Pat No. 2,819,919).

The corrugations 12, 13 can be constructed as grooves extending at an angle or as rows of individual indentations which are relatively small when compared to the thickness of the strip. Their width (their maximum dimension transversely to their longitudinal extent) should generally be less than the thickness of the strip, measured as the distance between raised areas on each surface. At any rate, the width should be less than five times the thickness or better still than three times the thickness. The orientation of the grooves or rows of individual indentations or of non-indented zones disposed between the indentations should have a directional component extending along the longitudinal orientation of the strip. This increases the flexibility of the strip in the transverse direction and reduces its tendency to be subject to incalculable irregular kinks and breakages when the packing is axially compressed. As a result, a more uniform density and cavity distribution is obtained.

As indentation or groove orientation along the longitudinal direction or at an angle thereto can be recognized in the exemplified embodiments of FIGS. 7 to 24, which are part of the invention, while FIG. 5 shows the prior art strip with grooves extending repetitively at 90° to the longitudinal orientation of the strip, but these grooves do not readily permit axial compression of the packing. In FIGS. 8 to 24, the raised regions 12 in the principal surface are shown in black in the appropriate plan view, while the indented zones 9 appear in white.

FIGS. 7 and 8 shows a strip provided on both sides with intersecting grooves which extend at the angle A to the transverse orientation of the strip. Each groove extends from one edge of the strip to the other. The grooves on one side are in offset configuration to the parallel grooves on the other side.

FIGS. 9 and 10 shows an example which, similarly to that in FIG. 7, is provided on both sides with mutually offset checkering configurations which extend at right-angles to each other but one checkering configuration extends perpendicularly to the longitudinal orientation of the strip while the other extends along said longitudinal orientation of the strip. This provides excellent flexibility in both directions.

FIGS. 11 and 12 shows an embodiment provided on both strip sides with parallel, offset checkering which extends at an angle A to the transverse direction of the strip. The checkering has directional components which are transverse as well as longitudinal to the axial direction of the strip and thus reduces the moment of resistance thereof in both directions in the desired manner.

The embodiments according to FIGS. 13-16 correspond to those according to FIGS. 7-10 with the difference that the indentations are not formed as continuous grooves but by rows of rhomboid indentations, those on one side being offset with respect to those on the other side. The unindented zones between the rows of indentations intersect and extend from one edge of the strip to the other, so that no continuous ducts are formed on the strip surface which would facilitate the transfer of medium.

The embodiments illustrated in FIGS. 17-20 are provided with checkering extending transversely in their entirely and the grooves on one side of the strip must again be imagined to be offset with respect to those on the other side of the strip. The individual grooves extend parallel in corrugated configuration (FIGS. 17 and 18) or in herringbone configuration (FIGS. 19 and 20). In zones in which checkering has a particularly distinct longitudinal component, the moment of resistance in the transverse direction is substantially reduced so that these zones function preferentially as buckling zones when the packing is axially compressed.

In the examples according to FIGS. 21-24, the strip is smooth on one side but on the other side it supports projecting spots which are elongated or oval in the case of FIG. 21-22, but are round in the case of FIG. 23-24. The zones between the spots in which the strip can be relatively thin have a reduced bending strength and are therefore to be regarded as indentations in the sense of the invention.

The spots can of course also be provided on both sides of the strip.

One advantage of the invention is due to the face that the small indentations form lubricating pockets in the running surface which reduce the specific coefficient of friction when the seal is used under dynamic conditions. The corrugated or zig-zag configuration of the grooves according to FIGS. 9-12 is intended mainly for reciprocating plungers and media with poor lubricating properties. They permit uniform wetting of the entire surface of contact.

By contrast, the spot embodiment according to FIGS. 13-16 is intended mainly for providing a sealing action under high pressure-volumetric loadings and the elongated form of the spots is suitable for media of low viscosity while the small round spots are better suited for media of high viscosity. On the one hand, this enables the amount of leakage to be controlled by appropriate selection of the spots, and on the other hand it is possible to control the specific frictional coefficient thereby.

I hereby claim:

1. A graphite containing strip seal for stuffing box packing designed to be sealingly coiled in layers about a rotatable shaft, said graphite having a maximum modulus of elasticity of 2000 N/mm$^2$, comprising:
   an upper and a lower surface with at least one of said surfaces having a plurality of raised areas and indentations such that when the strip is coiled the raised areas of one surface do not rest in the indentations of an abutting surface.
2. The seal according to claim 1 in which the average width of the indentation does not exceed five times the maximum thickness of the strip.
3. The seal according to claim 1 in which the average width of the indentation does not exceed three times the maximum thickness of the strip.
4. The strip seal according to claim 1 in which the indentations form grooves which extend substantially along the longitudinal orientation of the strip.
5. The strip seal according to claim 1 in which the width of the indentations does not exceed twice the distance between the bottom of the indentation and the top of the raised area.
6. The strip seal according to claim 1 in which open areas remain within the coiled material after axial compression of the seal.
7. The strip seal according to claim 6 in which the elastic recovery after axial compression at 15 Kgf/cm$^2$ is at least 3%.
8. The strip seal according to claim 6 in which the elastic recovery after compression at 20 Kgf/cm$^2$ is at least 5%.

* * * * *